United States Patent [19]

Belknap et al.

[11] 4,302,178
[45] Nov. 24, 1981

[54] VARIABLE PRESSURE VALVE

[75] Inventors: James L. Belknap, Parker City; William P. Coppin, Muncie, both of Ind.

[73] Assignee: Maxon Corporation, Muncie, Ind.

[21] Appl. No.: 120,263

[22] Filed: Feb. 11, 1980

[51] Int. Cl.³ .......................................... G05D 11/03
[52] U.S. Cl. ...................................... 431/19; 431/90; 137/100; 251/122
[58] Field of Search ................ 137/98, 100; 431/19, 431/90; 251/122

[56] References Cited

U.S. PATENT DOCUMENTS

| 2,382,625 | 8/1945 | Garretson | 137/100 |
|---|---|---|---|
| 2,432,274 | 12/1947 | Barr | 137/100 |
| 2,720,378 | 10/1955 | Otto | 251/61 |
| 2,852,032 | 9/1958 | Moore | 137/98 |
| 2,873,173 | 2/1959 | Neumeyer | 137/100 |
| 2,960,995 | 11/1960 | Hague | 137/83 |
| 3,002,550 | 10/1961 | Schreter | 431/16 |
| 3,007,516 | 11/1961 | Turpin | 431/183 |
| 3,013,767 | 12/1961 | DeHaven | 251/122 |
| 3,045,745 | 7/1962 | Turpin | 431/284 |
| 3,158,998 | 12/1964 | Robinson et al. | 137/98 |
| 3,404,702 | 10/1968 | Telford | 137/100 |
| 3,419,339 | 12/1966 | Schreter et al. | 431/284 |
| 3,493,005 | 2/1970 | Kakegawa | 137/100 |
| 3,630,224 | 12/1971 | Kalvelage | 137/375 |
| 3,709,461 | 1/1973 | Johnson | 251/58 |
| 3,724,504 | 4/1973 | Matsui et al. | 138/46 |
| 3,945,302 | 3/1976 | Downs | 92/13.2 |
| 4,020,861 | 5/1977 | Shihabi | 137/100 |

FOREIGN PATENT DOCUMENTS

| 621813 | 8/1962 | Belgium | 431/19 |
|---|---|---|---|
| 2708858 | 9/1978 | Fed. Rep. of Germany | 431/90 |

Primary Examiner—H. Jay Spiegel

[57] ABSTRACT

The pneumatically controlled, variable oil pressure regulator of the present invention maintains a selected combustion ratio of oil and air to a furnace and includes in preferred embodiments a diaphragm housing for a flexible air diaphragm and a flexible oil diaphragm, each preferably including a rolled peripheral lip portion for maximum extensibility and connected to a valve plug having the shape of a solid of revolution formed by rotating a convexly curved surface such as an arc of a circle of less than approximately 90° or a corresponding portion of a hyperbolic, parabolic, or elliptical curve, which intersects the longitudinal axis of the valve plug stem about the longitudinal axis thereof to approximate an ellipsoidal shape whereby very low minimum flow rates can be effected without oscillation of the valve.

7 Claims, 1 Drawing Figure

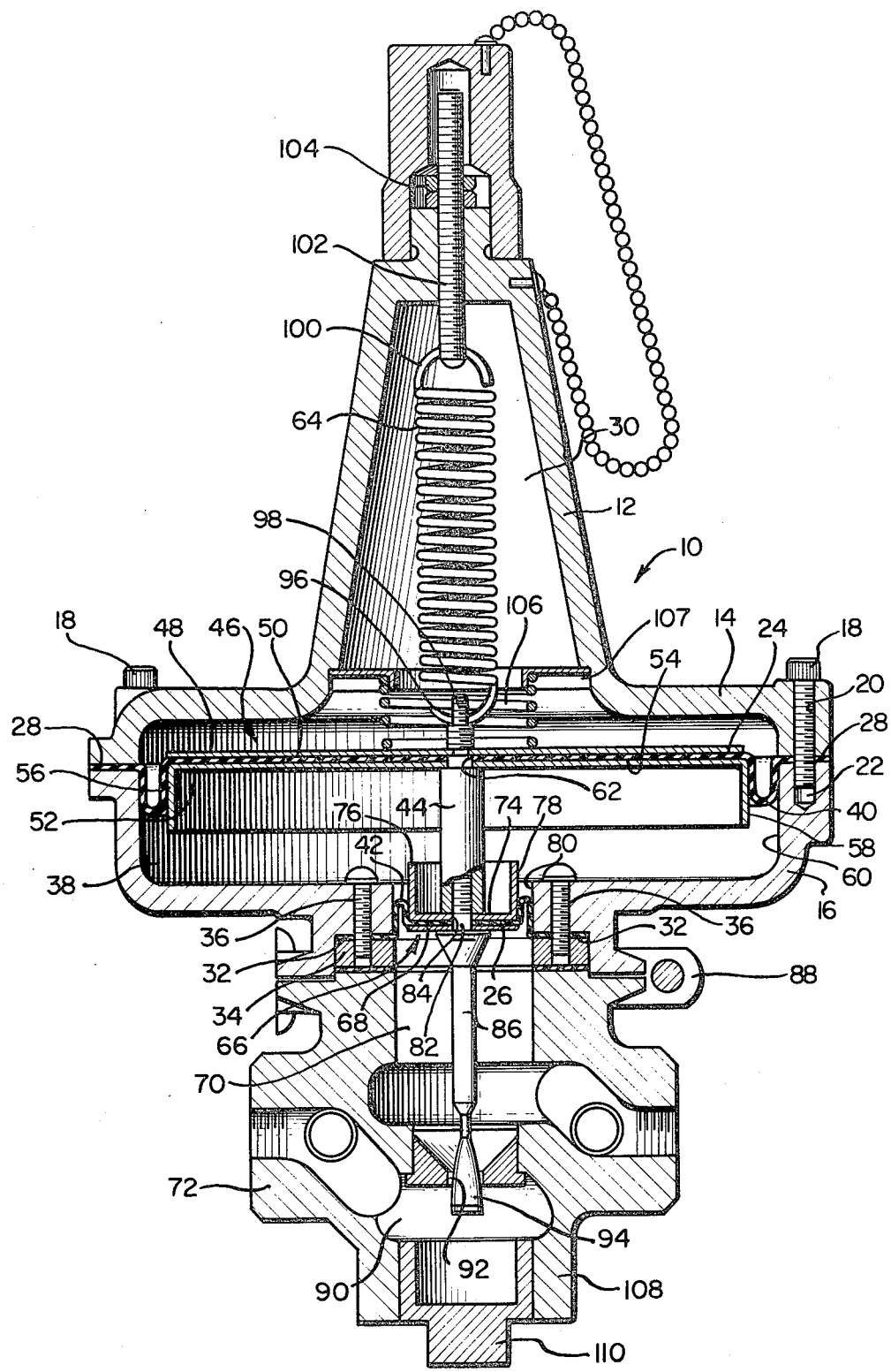

VARIABLE PRESSURE VALVE

BACKGROUND OF THE INVENTION

The present invention relates generally to oil pressure regulator valves and more particularly to a pneumatically controlled variable oil pressure regulator for maintaining a selected combustion ratio of oil and air to a furnace, said valve incorporating flexible oil and air diaphragms having rolled peripheral portions for maximum extensibility and a valve plug approximating the ellipsoidal shape whereby very low flow rates may be effected without causing oscillation of the valve.

The prior art discloses a wide variety of valve mechanisms, many of which are overly complex in their elements and structure, resulting in undue initial expense and in unreliability and a high cost of maintenance. Other prior art valve systems have utilized various valve plug shapes in conjunction with different seating shapes.

The typical prior art valve includes a cone-shaped valve plug seating into a circular orifice. Another prior art valve shape is that of the sphere seating also into a circular orifice. In both such cases, the area of the valve opening varies almost directly as the distance traveled by the valve stem varies. For example, a typical cone-type valve has a maximum travel of 0.15 inches. At 10% of its maximum capacity, the cone is only 0.015 inches from the seat. At 1% of maximum capacity, the plug is 0.0015 inches from the seat. Because in any regulated flow there are small fluctuations in inlet, outlet, and back pressure (analogous to background noise in an electronic system), a small change in oil back pressure of the order of magnitude of 1/1000th of a pound can be caused by combustion reverberation.

This minute change will move the cone valve plug a distance of the order of magnitude of thousands of an inch and close the valve. In such circumstances, the outlet pressure will drop and cause the valve to open. This oscillating phenomenon may be observed in the prior art cone-type valve when it is operated at low flows of from five gallons per hour down to fractions of a gallon per hour.

It is thus a primary object of the present invention to overcome these and other deficiencies of the prior art by providing the improved variable oil pressure regulator of the present invention, as disclosed and claimed hereinbelow.

SUMMARY OF THE INVENTION

The pneumatically controlled variable oil pressure regulator of the present invention as set forth more fully hereinbelow, is directed to a valve including oil and air pressure chambers which are separated respectively by air and oil diaphragms, each of which includes a rolled peripheral portion for maximum extensibility of the attached valve stem. The valve stem connects the air and oil diaphragms thereby to transmit the collective pressures received from each.

The valve stem supports a valve plug at the distal end thereof having a shape in the form of a solid of revolution formed by rotating an arc of a circle of less than approximately 90° which intersects the longitudinal axis of the valve stem about such longitudinal axis, to thereby approximate the ellipsoidal shape. The valve seat for the valve plug is of the standard circular aperture shape, having a diameter slightly larger than that of the valve plug. Thus, when the valve is throttled to minimum flows, the plug does not seat on the orifice, but simply plugs the orifice as tightly as manufacturing the tolerances will allow. Accordingly, the non-seating plug does not shut completely off, and unusually low minimum flows can be effected without oscillation caused by the cycling of the valve, on and off, at low flow, as has occurred with regulators utilizing prior art seating constructions.

The variable oil pressure regulator of the present invention and exemplary embodiments thereof may be more completely understood with reference to the following drawing and the detailed description of preferred embodiments.

BRIEF DESCRIPTION OF THE DRAWING

An exemplary embodiment of the variable oil pressure regulator of the present invention is illustrated in the following drawing, in which:

FIG. 1 is a longitudinal cross-sectional view of the variable oil pressure regulator of the present invention.

DETAILED DESCRIPTION OF PREFERRED EMBODIMENTS

The pneumatically controlled, variable oil pressure regulator of the present invention is utilized for maintaining a selected combustion ratio of oil and air to a furnace. The furnace, typically utilized in conjunction therewith, includes a combustion air control valve for controlling the flow of air to an orifice inlet supplying air to a furnace combustion chamber.

The variable oil pressure regulator of the present invention includes a diaphragm housing containing flexible air and oil diaphragms. The air diaphragm is sealingly disposed transversely within the diaphragm housing to define a first air chamber therein. The first air chamber has a pressure impulse line communicating with the combustion air line downstream of the combustion air control valve and upstream of the furnace combustion chamber orifice inlet, thereby to receive and monitor the air pressure thereof. The result is that the air pressure in the combustion air line is directed against the flexible air diaphragm which is distensible in response thereto.

A deflectible oil diaphragm is also sealingly disposed transversely within the diaphragm housing to define a second air chamber adjacent to the first air chamber. The second air chamber is connected to a back pressure impulse line communicating with the furnace combustion chamber and to receive and monitor the pressure present in the combustion chamber to the second air chamber. The result is that the air pressure in the combustion chamber is directed against both the air and oil diaphragms to sum algebraically the combustion air line pressure and the furnace combustion chamber pressure.

An air diaphragm reenforcing means is preferably disposed in contacting relationship with the air diaphragm for substantially reenforcing the entirety of the air diaphragm and leaving only the peripheral regions of the air diaphragm not reenforced. The variable oil pressure regulator of the present invention also includes a similarly structured oil diaphragm reenforcing means which is disposed in contacting relationship with the oil diaphragm for substantially reenforcing the entirety of the oil diaphragm and leaving only the peripheral regions thereof not reenforced.

A diaphragm spacer is positioned between the air diaphragm reenforcing means and the oil diaphragm reenforcing means within the second air chamber to dispose the reenforced diaphragms in fixed, spaced relationship and to move the oil diaphragm in response to the sum of the combustion air line pressure and the combustion chamber pressure. A valve body connected to the diaphragm housing and defining an oil inlet chamber and an oil outlet chamber is further provided.

A valve orifice, which is substantially circular in shape in transverse cross-section, is disposed internally of the valve body and separates the oil inlet chamber from the oil outlet chamber for controlling the flow of oil therebetween.

A valve stem is connected at its proximal end to the oil diaphragm reenforcing means and extends longitudinally into the oil outlet chamber, thereby to move longitudinally in response to the movement of the oil diaphragm, and thereby in response to the algebraically summed pressures of the combustion air line and the combustion chamber. A valve plug is disposed on and connected to the distal end of the valve stem for longitudinal displacement snugly within the valve orifice, but without seating on the valve orifice, to regulate the flow of oil from the oil inlet chamber to the oil outlet chamber of the valve body. The valve plug has a shape approximating the ellipsoical shape, which shape is formed by rotating an arc of a circle of less than approximately 90° or a corresponding portion of a hyperbolic, parabolic, or elliptical curve, which intersects the longitudinal axis of the valve stem about such longitudinal axis.

In preferred embodiments, the variable oil pressure regulator of the present invention includes air and oil diaphragms having a rolled lip at the periphery thereof for extended longitudinal distensibility within the diaphragm housing.

In yet further alternative preferred embodiments, the oil pressure regulator of the present invention may include spring loaded tension means operatively connected to the air and oil diaphragms for initially determining the longitudinal displacement of the valve plug within the valve orifice, which thereby fixes an initial ratio of oil to air pressure. This spring-loaded tension means is preferably attached to the proximal end of the diaphragm spacer means, and preferably includes two coil springs disposed in counterbalancing relationship, at least one of which is adjustable in tension. In particular, the spring loaded tension means may preferably include an adjusting coil spring which is attached to the diaphragm spacer at its distal end and at its proximal end to a screw tension adjustment means to exert thereby a longitudinal force in a first direction on the connected diaphragms. A second, compensating coil spring is preferably disposed between a stationary spring support and the air diaphragm to exert a longitudinal force in a second direction thereon. These longitudinal, oppositely directed forces in combination initially determine the displacment of the valve plug within the valve orifice, and thereby control and determine the oil to air ratio.

The air diaphragm reenforcing means of the variable oil pressure regulator of the present invention preferably includes a first reenforcing disc disposed within the first air chamber on a first side of the air diaphragm and a second reenforcing disc disposed within the second air chamber and on the second side of the air diaphragm. The second disc preferably includes a peripheral ring extending into the second air chamber adjacent to the rolled lip of the air diaphragm for retaining the rolled lip between the outer surface of the peripheral ring and the interior surface of the diaphragm housing. Each of the first and second air diaphragm reenforcing discs includes in preferred embodiments, a centrally disposed aperture for extension of the diaphragm spacer therethrough for connection with the adjusting coil spring.

The oil diaphragm reenforcing means is similar in structure to the air diaphragm reenforcing means and comprises a first reenforcing disc disposed within the oil outlet chamber on one side of the oil diaphragm and a second reenforcing disc disposed within the second air chamber and on the opposite side of the oil diaphragm. The second disc includes a peripheral ring extending into the second air chamber adjacent the rolled lip of the oil diaphragm for retaining the rolled lip between the outer surface of the oil diaphragm peripheral ring and the interior surface of at least one of the diaphragm housing and the valve body oil outlet chamber. Each of the first and second oil diaphragm reenforcing discs preferably includes a centrally disposed aperture therein for operative connection between the valve stem and the diaphragm spacer therethrough.

Other preferred alternative embodiments of the variable oil pressure regulator of the present invention may include a diaphragm housing which is separable from the valve body and connected thereto by a retainer clamp for expedited inspection and cleaning of the valve stem, valve plug, and valve orifice.

Also, in further alternative preferred embodiments, a check valve assembly may be attached to the lower portion of the diaphragm housing. In the event of an oil diaphragm rupture, such check valve would prevent the leakage of oil therefrom.

With reference to the drawing and in particular FIG. 1 thereof, wherein an exemplary embodiment of the variable oil pressure regulator of the present invention is set forth pictorially, there is shown the variable oil pressure regulator of the present invention generally at 10. Oil pressure regulator 10 includes a diaphragm housing 12 having upper and lower connected portions 14, 16, which are sealingly connected by means of through bolts 18 engaging sockets 20 matching threaded sockets 22 of the upper and lower diaphragm housing portions 14, 16 respectively. Disposed within diaphragm housing 12 are flexible air and flexible oil diaphragms 24 and 26. The flexible air diaphragm 24 is sealingly disposed transversely within diaphragm housing 12 preferably by engagement of the extreme peripheral portion 28 of flexible air diaphragm 24 in disposition between upper and lower portions 14, 16 of diaphragm housing 12. Such transversely disposed flexible air diaphragm 24 defines a first air chamber 30 within diaphragm housing 12 which is connected to a pressure air impulse line communicating with the combustion air downstream of the combustion air control valve and upstream of the furnace combustion chamber orifice inlet (not shown) to receive and monitor the air pressure thereof.

The flexible oil diaphragm 26 is similarly sealingly disposed transversely within lower portion 16 of diaphragm housing 12 and is attached at the extreme peripheral portion 32 thereof to such lower portion 16 of diaphragm housing 12 by means of a peripheral disc 34. Peripheral disc 34 is attached by means of threaded bolts 36 to lower portion 16 of the diaphragm housing 12. Flexible oil diaphragm 26 defines a second air chamber 38 adjacent to first air chamber 30, which is communicated with a back pressure impulse line connected to the furnace combustion chamber (not shown) to receive and monitor the pressure present in the combustion chamber in second air chamber 38. Each of air diaphragm 24 and oil diaphragm 26 includes a respective rolled lip portion 40, 42 near peripheries 28, 32 thereof for extended longitudinal distensibility within diaphragm housing 12.

Air and oil pressure diaphragms 24, 26 are held in spaced longitudinal configuration by means of a diaphragm spacer 44 disposed therebetween and within second air chamber 38, such that oil diaphragm 26 will move in response to the sum of the combustion air line pressure and the combustion chamber pressure as transmitted to first and second air chambers 30, 38.

Air diaphragm 24 includes a reenforcing means generally 46 which includes a first reenforcing disc 48 disposed within first air chamber 30 and on a first side 50 of air diaphragm 24. A second reenforcing disc 52 is disposed within second air chamber 38 and on the second side 54 of the air diaphragm 24, with second disc 52 including a downwardly disposed peripheral ring 56 extending into second air chamber 38 adjacent rolled lip 40 of air diaphragm 24 to retain rolled lip 40 between the outer surface 58 of peripheral ring 56 and the interior surface 60 of diaphragm housing 12. First air diaphragm reenforcing means 46 further includes a centrally disposed aperture 62 therein for extension of diaphragm spacer 44 therethrough for connection with an adjusting coil spring 64.

Similarly, oil diaphragm 26 is reenforced by oil diaphragm reenforcing means generally 66, which includes a first reenforcing disc 68 disposed within the oil outlet chamber 70 of the valve body 72, and on one side of oil diaphragm 26. A second reenforcing disc 74 is disposed within second air chamber 38 on the opposite of oil diaphragm 26. Second disc 74 includes a peripheral ring 76 extending upwardly into second air chamber 38 adjacent to rolled lip 42 of oil diaphragm 26 for retaining rolled lip 42 between the outer surface 78 of oil diaphragm peripheral ring 76 and the interior surface 80 of at least one of diaphragm housing lower portion 16 and valve body oil outlet chamber 70. Each of first and second oil diaphragm reenforcing disc 68, 74 also includes a centrally disposed aperture 82, 84 therein for operative connection between the valve stem 86 and diaphragm spacer 44 therethrough.

Valve body 72 of oil pressure regulator of the present invention generally 10, is connected to diaphragm housing lower portion 16 preferably by means of a V-retainer clamp 88 and is thus easily separably therefrom. Valve body 72 defines an oil inlet chamber 90 and oil outlet chamber 70. A valve orifice 92, which is preferably substantially circular in transverse cross-sectional shape is disposed internally of the valve body 72 and separates oil inlet chamber 90 from oil outlet chamber 70 for controlling the flow of oil therebetween.

Valve stem 86 is connected at the proximal end thereof to oil diaphragm reenforcing means generally 66 and extends longitudinally into oil outlet chamber 70 to move in response to the collective movement of oil and air diaphragms 24, 26. A valve plug 94 is disposed on and connected to the distal end of valve stem 86 for longitudinal displacement snugly, but without seating, within valve orifice 92 to regulate the flow of oil from oil inlet chamber 90 to oil outlet chamber 70 of valve body 72. Valve plug 94 has a shape of a solid of revolution formed by rotation an arc of a circle of less than approximately 90° which intersects the longitudinal axis of valve stem 86 about the longitudinal axis thereof, whereby an ellipsoidal shape is approximated.

The initial position of the interconnected air and oil diaphragms 24, 26 is controlled by means of spring tension specifically, adjusting coil spring 64 is attached at the distal end 96 thereof to diaphragm spacer 44 proximal end 98, and at the proximal end 100 of adjusting coil spring 64 to a screw tension adjustment bolt 102 seated within a seal nut 104, thereby to exert a longitudinal force in a first direction on the interconnected air and oil diaphragms 24, 26. A compensating coil spring 106 is disposed between a stationary spring support 107 and air diaphragm first reenforcing disc 48 to exert a longitudinal force in a second direction on the diaphragms 24, 26. The longitudinal oppositely directed forces in combination initially determine the displacement of valve plug 94 with respect to valve orifice 92, and thereby control the oil to air ratio through the oil control regulator of the present invention 10.

The variable oil pressure regulator of the present invention 10 may further include, at the extreme bottom portion 108 of valve body 72, a removable plug 110 for cleaning oil inlet 90 and valve orifice 92. In combination therewith, retainer clamp 88 may be removed to disconnect valve body 72 from lower portion 16 of diaphragm housing 12 to clean the oil outlet chamber 70.

Although preferred alternative embodiments have been disclosed hereinabove, it will be apparent to those skilled in the art that numerous modifications which do not depart from the spirit and scope of the invention can be devised, and the appended claims are intended to cover all such modifications.

What is claimed is:

1. A pneumatically controlled, variable oil pressure regulator for maintaining a selected combustion ratio of oil and air in a furnace having a combustion air control valve for controlling flow of air to an orifice inlet supplying air through a combustion air line to the furnace combustion chamber with a back pressure impulse line connected thereto, the variable oil pressure regulator comprising:

a diaphragm housing;

a flexible air diaphragm sealingly disposed within said diaphragm housing to define a first air chamber in said diaphragm housing, said first air chamber communicating with the combustion air line downstream of the combustion air control valve and upstream of the furnace combustion chamber orifice inlet to receive and monitor the air pressure thereof, whereby the air pressure in the combustion air line is directed against said flexible air diaphragm which is distensible in response thereto;

a flexible oil diaphragm sealingly disposed within said diaphragm housing to define a second air chamber adjacent the first air chamber and connected to the back pressure impulse line communicating with the furnace combustion chamber to receive and monitor the pressure present in the combustion chamber within said second air chamber, whereby the air pressure in the combustion chamber is directed against both said air and oil diaphragms to sum algebraically the combustion air line pressure and the furnace combustion chamber pressure;

air diaphragm reenforcing means disposed in contacting relationship with said air diaphragm for substantially reenforcing the entirety of said air diaphragm and leaving only the peripheral regions of the air diaphragm not reenforced;

oil diaphragm reenforcing means disposed in contacting relationship with said oil diaphragm for substantially reenforcing the entirety of said oil diaphragm and leaving only the peripheral regions of the oil diaphragm not reenforced;

diaphragm spacer means disposed between said air diaphragm reenforcing means and said oil diaphragm reenforcing means within the second air chamber to dispose said reenforced air and oil diaphragm in fixed, spaced relationship and to move the oil diaphragm in response to the sum of the combustion air line pressure and the combustion chamber pressure;

a valve body connected to said diaphragm housing and defining an oil inlet chamber and an oil outlet chamber;

a valve orifice substantially circular shape in transverse cross-section disposed internally of said valve body and separating said oil inlet chamber from said oil outlet chamber for controlling the flow of oil therebetween;

a valve stem connected at the proximal end thereof with said oil diaphragm and extending longitudinally into said oil outlet chamber, thereby to move longitudinally in response to the movement of said oil diaphragm and thereby in response to the algebraically summed pressures of the combustion air line and the combustion chamber;

a valve plug disposed on and connected to the distal end of said valve stem for longitudinal displacement snugly within said valve orifice to regulate the flow of oil from said oil inlet chamber to said oil outlet chamber of the valve body, said valve plug having the shape of a solid of revolution formed by rotating a convexly curved surface which intersects the longitudinal axis of the valve stem about said longitudinal axis, said convexly curved surface being selected from the group consisting of an arc of a circle of less than about 90°, a hyperbolic curve, a parabolic curve, or an elliptical curve whereby an elliptical shape is approximated further comprising spring loaded tension means operatively connected to said air and oil diaphragms for initially determining the longitudinal displacement of said valve plug within said valve orifice to fix thereby an initial ratio of oil pressure to air pressure, said spring loaded tension means comprising an adjusting tension coil spring which is attached at the distal end to said diaphragm spacer and at the proximal end to screw tension adjustment means to exert a longitudinal force in a first direction on said diaphragms; and a compensating compression coil spring disposed between a stationary spring support and said air diaphragm to exert a longitudinal force in a second direction on said diaphragms, said longitudinal oppositely directed forces in combination initially determining the displacement of said valve plug with respect to said valve orifice and thereby the oil to air ratio.

2. The variable oil pressure regulator of claim 1 wherein:
said air diaphragm includes a rolled lip at the periphery thereof for extended longitudinal distensibility within said diaphragm housing.

3. The variable oil pressure regulator of claim 1 wherein;
said oil diaphragm includes a rolled lip at the periphery thereof for extended longitudinal distensibility within said diaphragm housing.

4. The variable oil pressure regulator of claim 1 wherein the air diaphragm reenforcing means comprises:
a first reenforcing disc disposed within the first air chamber on a first side of said air diaphragm and a second reenforcing disc disposed within the second air chamber and on the second side of said air diaphragm, said second disc including a peripheral ring extending into the second air chamber adjacent said rolled lip of said air diaphragm for retaining said rolled lip between the outer surface of the peripheral ring and the interior surface of said diaphragm housing.

5. The variable oil pressure regulator of claim 4 wherein each of said first and second air diaphragm reenforcing discs includes a centrally disposed aperture therein for extension of said diaphragm spacer therethrough for connection with said adjusting coil spring.

6. The variable oil pressure regulator of claim 1 wherein the oil diaphragm reenforcing means comprises:
a first reenforcing disc disposed within the oil outlet chamber on one side of said oil diaphragm and a second reenforcing disc disposed within the second air chamber and on the opposite side of said oil diaphragm, said second disc including a peripheral ring extending into the second air chamber adjacent said rolled lip of said oil diaphragm for retaining said rolled up lip between the outer surface of the oil diaphragm peripheral ring and the interior surface of at least one of said diaphragm housing and said valve body oil outlet chamber.

7. The variable oil pressure regulator of claim 6 wherein each of said first and second oil diaphragm reenforcing discs includes a centrally disposed aperture therein for operative connection between said valve stem and said diaphragm spacer therethrough.

* * * * *